United States Patent
Jung

(10) Patent No.: US 10,122,553 B2
(45) Date of Patent: Nov. 6, 2018

(54) TRANSMITTING DEVICE FOR HIGH SPEED COMMUNICATION, INTERFACE CIRCUIT AND SYSTEM INCLUDING THE SAME

(71) Applicant: SK hynix Inc., Icheon-si, Gyeonggi-do (KR)

(72) Inventor: Hae Kang Jung, Icheon-si (KR)

(73) Assignee: SK hynix Inc., Icheon-si, Gyeonggi-do (KR)

(*) Notice: Subject to any disclaimer, the term of this patent is extended or adjusted under 35 U.S.C. 154(b) by 0 days.

(21) Appl. No.: 15/375,946

(22) Filed: Dec. 12, 2016

(65) Prior Publication Data

US 2017/0093602 A1    Mar. 30, 2017

Related U.S. Application Data

(62) Division of application No. 14/820,244, filed on Aug. 6, 2015, now abandoned.

(30) Foreign Application Priority Data

Apr. 10, 2015    (KR) .................. 10-2015-0050940

(51) Int. Cl.
*H04L 25/49* (2006.01)
*H04L 7/033* (2006.01)

(52) U.S. Cl.
CPC ........ *H04L 25/4927* (2013.01); *H04L 7/0334* (2013.01)

(58) Field of Classification Search
CPC .................. H04L 7/0334; H04L 25/4927
See application file for complete search history.

(56) References Cited

U.S. PATENT DOCUMENTS

| | | | | |
|---|---|---|---|---|
| 7,863,936 B1* | 1/2011 | Liu | ................ | H03K 19/01858 326/26 |
| 8,410,818 B1* | 4/2013 | Hsu | ................ | H03K 19/0013 326/27 |
| 2006/0034134 A1* | 2/2006 | Choi | ................ | G11C 7/1045 365/193 |
| 2008/0022179 A1* | 1/2008 | Lee | ................ | H04L 1/0025 714/748 |
| 2009/0296851 A1* | 12/2009 | Ono | ................ | H04L 25/0272 375/295 |
| 2011/0310992 A1* | 12/2011 | Franzon | ................ | H04L 25/4917 375/286 |
| 2012/0280724 A1* | 11/2012 | Chan | ................ | H04B 3/06 327/108 |
| 2013/0076395 A1* | 3/2013 | Kim | ................ | H03K 19/01858 326/87 |
| 2014/0035625 A1 | 2/2014 | Hafizi et al. | | |
| 2014/0266319 A1 | 9/2014 | Bodem et al. | | |

* cited by examiner

*Primary Examiner* — Kenneth Lam
(74) *Attorney, Agent, or Firm* — William Park & Associates Ltd.

(57) ABSTRACT

A transmission device may include a main driver configured to drive an output node based on an input signal, and may generate an output signal with multiple levels. The transmission device may include a variable emphasis driver configured to drive the output node with various driving forces based on transition information of the input signal.

11 Claims, 7 Drawing Sheets

TRANSMITTING DEVICE FOR HIGH SPEED COMMUNICATION, INTERFACE CIRCUIT AND SYSTEM INCLUDING THE SAME

CROSS-REFERENCES TO RELATED APPLICATION

The present application is a divisional application of U.S. application Ser. No. 14/820,244, filed on Aug. 6, 2015, and the present application claims priority under 35 U.S.C. § 119(a) to Korean application number 10-2015-0050940, filed on Apr. 10, 2015, in the Korean Intellectual Property Office, which is incorporated herein by reference in its entirety.

BACKGROUND

1. Technical Field

Various embodiments generally relate to a communication system, and more particularly, to a transmitting device for high speed communication, an interface circuit and a system including the same.

2. Related Art

Electronic products for personal uses, such as a personal computer, a tablet PC, a laptop computer and a smart phone, are constructed by various electronic components. Two different electronic components in the electronic products may communicate at a high speed to process a large amount of data within a short amount of time. The electronic components generally communicate through interface circuits. The electronic components communicate in various schemes. As an example, one of the schemes may be a serial communication scheme.

As the performances of electronic components are improved, necessity for a communication scheme capable of increasing a bandwidth and reducing power consumption is being increased. In order to meet such necessity, various new serial communication schemes are suggested in the art, and improved interface circuits for supporting the new serial communication schemes are being developed.

SUMMARY

In an embodiment, a transmission device may be provided. The transmission device may include a main driver. The main driver may be configured to drive an output node based on an input signal, and may be configured to generate an output signal with multiple levels. The transmission device may include a variable emphasis driver configured to drive the output node with various driving forces based on transition information of the input signal.

In an embodiment, a transmission device may be provided. The transmission device may include a main driver configured to output an output signal with one level among a high level, a middle level and a low level, to an output node, based on an input signal. The transmission device may include a variable emphasis driver configured to drive the output node with one of first and second driving forces based on transition information of the input signal.

In an embodiment, a transmission device may be provided. The transmission device may include a variable emphasis driver configured to change a pre-emphasis strength according to a level by which an input signal transitions to control a transition time of an output signal.

DETAILED DESCRIPTION

Hereinafter, an interface circuit for high speed communication and a system including the same will be described below with reference to the accompanying drawings through various examples of embodiments.

Figure 1:
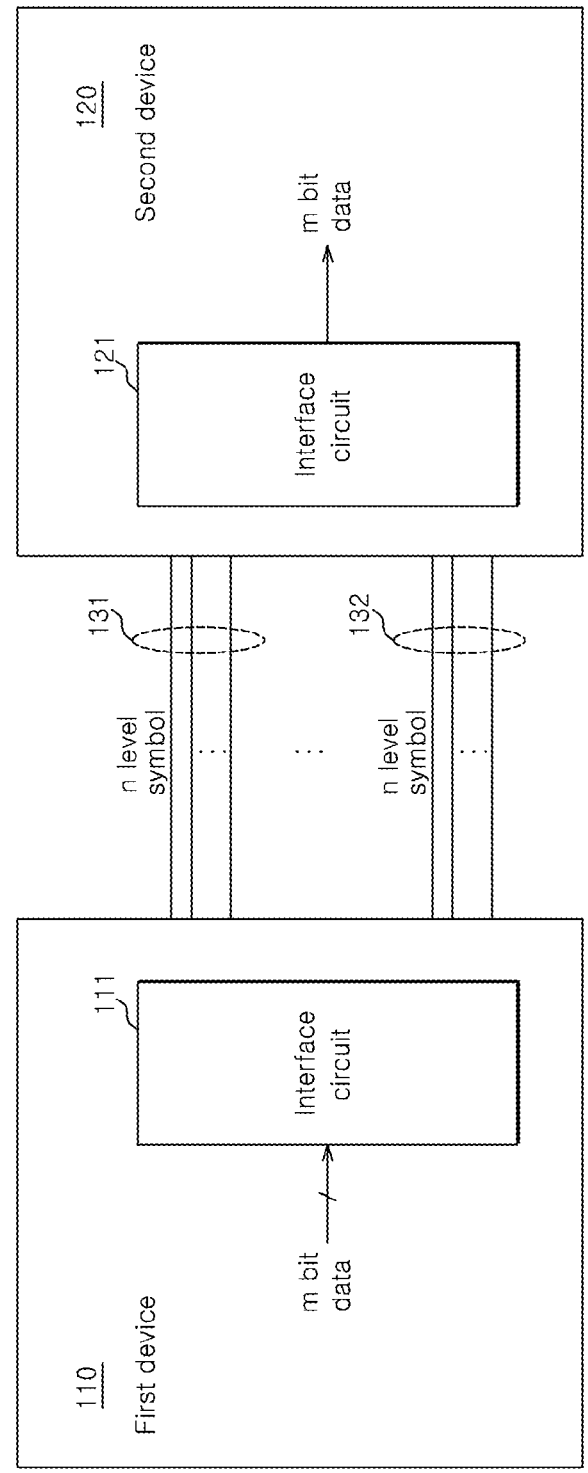
FIG. 1 is a diagram illustrating a representation of an example of the configuration of a system in accordance with an embodiment.

Referring to FIG. 1, a system 1 in accordance with an embodiment may include a first device 110 and a second device 120. The first device 110 may represent a component configured to transmit data, and the second device 120 may represent a component configured for receiving the data transmitted from the first device 110. For example, the system 1 may include a master device and a slave device. When data are transmitted from the master device to the slave device, the master device may be the first device 110, and the slave device may be the second device 120. Conversely, when data is transmitted from the slave device to the master device, the master device may be the second device 120, and the slave device may be the first device 110.

The master device may be a host device such as a processor, and the processor may include, for example but not limited to, a central processing unit (CPU), a graphic processing unit (GPU), a multimedia processor (MMP) or a digital signal processor (DSP). The master device may be realized in the form of a system-on-chip (SoC) by combining processor chips having various functions, such as application processors. The slave device may be a memory, and the memory may include a volatile memory and/or a nonvolatile memory. The volatile memory may include, for example but not limited to, an SRAM (static RAM), a DRAM (dynamic RAM) and an SDRAM (synchronous DRAM), and the nonvolatile memory may include, for example but not limited to, a ROM (read only memory), a PROM (programmable ROM), an EEPROM (electrically erasable and programmable ROM), an EPROM (electrically programmable ROM), a flash memory, a PRAM (phase change RAM), an MRAM (magnetic RAM), an RRAM (resistive RAM) and an FRAM (ferroelectric RAM).

The first device 110 and the second device 120 may be electrically coupled through at least one signal transmission line group, and form a link. The first device 110 and the second device 120 may communicate in a balanced code multilevel signal transmission scheme through the at least one signal transmission line group. The at least one signal transmission line group may include a plurality of signal transmission lines. For example, in the example where the first device 110 and the second device 120 use an n level (phase or state) signal transmission scheme, the number of signal transmission lines forming one signal transmission line group may be equal to or larger than n. The first device 110 and the second device 120 may be electrically coupled through a plurality of signal transmission line groups. In FIG. 1, the first device 110 and the second device 120 may be electrically coupled through first and second signal transmission line groups 131 and 132, and each of the first and second signal transmission line groups 131 and 132 may include at least n signal transmission lines.

The first device 110 and the second device 120 may respectively include interface circuits 111 and 121. The interface circuits 111 and 121 may be physical layers for communication between the first device 110 and the second device 120. The interface circuit 111 of the first device 110 may convert a plurality of data into n level symbols, and may transmit the n level symbols to the second device 120 through the signal transmission line groups 131 and 132. The n level symbols may be configured by balanced codes. The interface circuit 121 of the second device 120 may receive the n level symbols transmitted through the signal transmission line groups 131 and 132, and may recover the n level symbols into the plurality of data. For instance, in the example where the plurality of data are m bits, the interface circuit 111 of the first device 110 may convert the m bit data into a plurality of n level symbols, and may sequentially transmit in series the plurality of n level symbols through the signal transmission lines. The interface circuit 121 of the second device 120 may sequentially receive the plurality of n level symbols, and recover the m bit data based on the plurality of n level symbols. In the example where the first device 110 and the second device 120 include a plurality of signal transmission line groups, information corresponding to the number of signal transmission line groups*n level symbols may be simultaneously transmitted.

In an embodiment, one of the n level symbols may not be configured by a balanced code, and the plurality of n level symbols may be configured by balanced codes. That is to say, the plurality of n level symbols may become balanced codes in their entireties. Accordingly, even though each symbol is not configured by a balanced code, in the example where the plurality of n level symbols are transmitted through the signal transmission line groups 131 and 132, balanced code multilevel signal transmission may be implemented.

Figure 2:
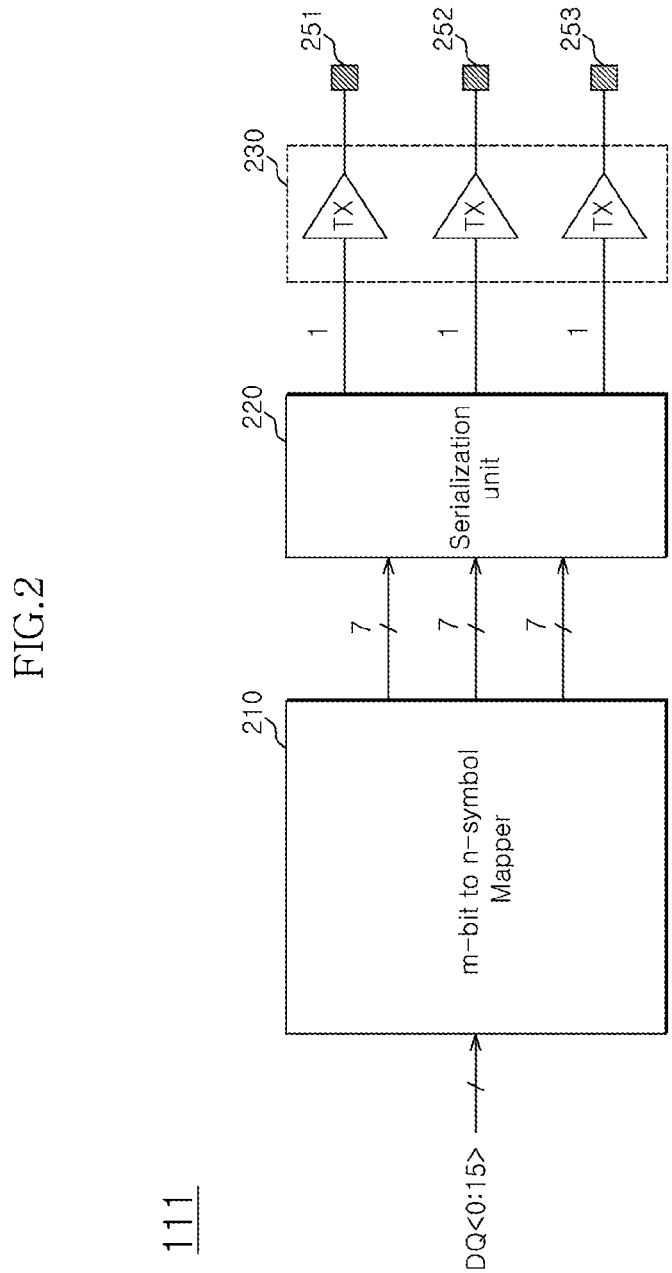
FIG. 2 is a diagram illustrating a representation of an example of the configuration of the interface circuit of the first device illustrated in FIG. 1.

FIG. 2 is a diagram illustrating a representation of an example of the configuration of the interface circuit 111 of the first device 110 illustrated in FIG. 1. Referring to FIG. 2, the interface circuit 111 of the first device 110 may include a mapper 210, a serialization unit 220, and a transmission driver 230. In FIG. 2, it is illustrated as an example that the interface circuit 111 is disposed for a three level serial communication scheme. Also, it is illustrated as an example that the interface circuit 111 is electrically coupled with the interface circuit 121 of the second device 120 through one signal transmission line group, and the one signal transmission line group may include three signal transmission lines 251, 252 and 253 to transmit three level symbols. The mapper 210 may convert data into symbols. For example, the mapper 210 may convert 16 bit data DQ<0:15> into seven symbols. Each symbol may have three level information. The data DQ<0:15> may be information of a pattern suitable for being used in the first device 110 and the second device 120. The mapper 210 may convert the data DQ<0:15> into symbols corresponding to the pattern of the data DQ<0:15> according to a table stored therein. For example, the mapper 210 may encode seven symbols, each symbol having three level information. Three levels may be defined as a high level, a middle level and a low level. For example, the high level may have a voltage level corresponding to $3/4$ V, the middle level may have a voltage level corresponding to $2/4$ V, and the low level may have a voltage level corresponding to $1/4$ V. Since a system using the multilevel signal transmission scheme such as the system 1 of FIG. 1 does not use a clock signal, the first device 110 and the second device 120 may internally generate clock signals based on the signals transmitted through the signal transmission line groups 131 and 132.

The serialization unit 220 may receive the seven symbols, each symbol having the three level information, and sequentially output the seven symbols, each symbol having the three level information. The transmission driver 230 may sequentially output the seven symbols, each symbol having the three level information, outputted from the serialization unit 220, to the signal transmission lines 251, 252 and 253. The transmission driver 230 may include three transmitters TX, and the three transmitters TX may respectively output one of three level symbols outputted from the serialization unit 220, to the signal transmission lines 251, 252 and 253. The serialization unit 220 and the transmission driver 230 may transmit in series seven symbols through the signal transmission lines 251, 252 and 253.

Figure 3:
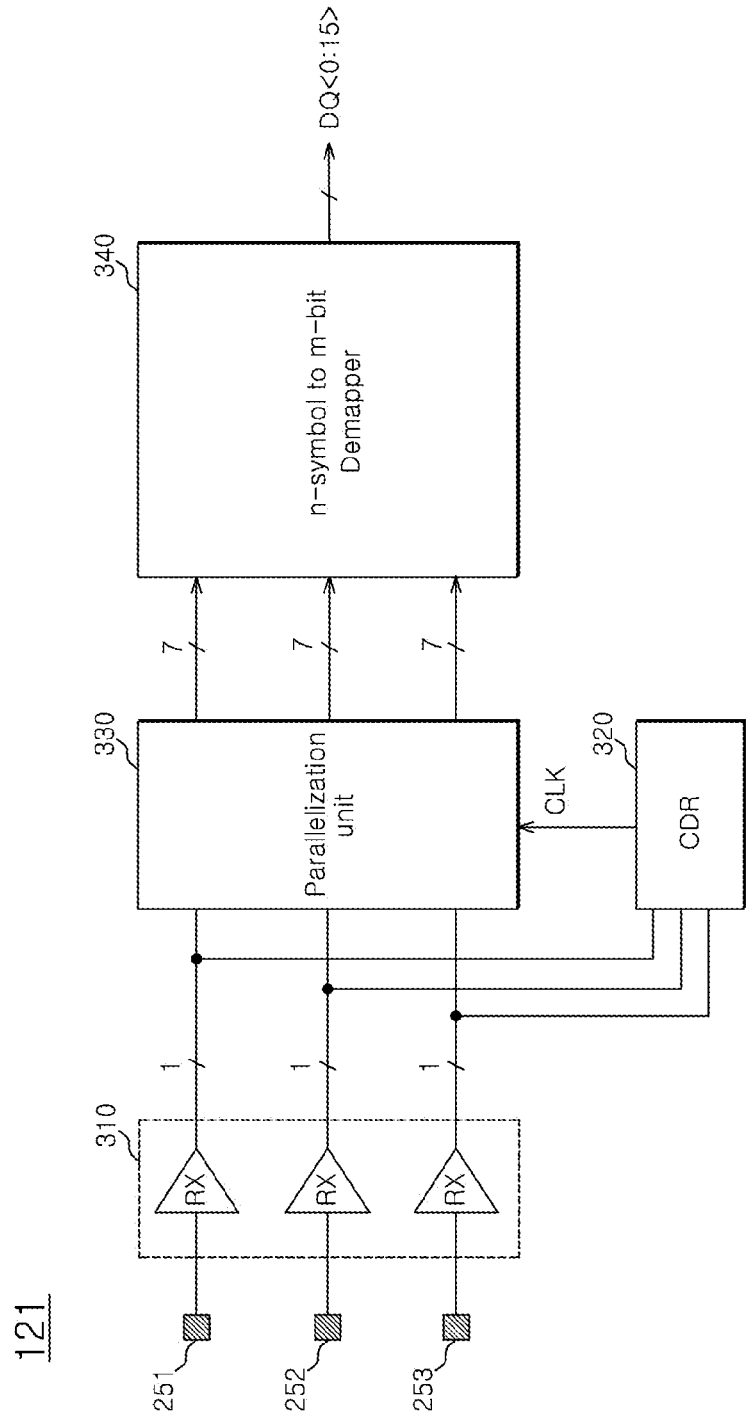
FIG. 3 is a diagram illustrating a representation of an example of the configuration of the interface circuit of the second device illustrated in FIG. 1.

FIG. 3 is a diagram illustrating a representation of an example of the configuration of the interface circuit 121 of the second device 120 illustrated in FIG. 1. Referring to FIG. 3, the interface circuit 121 of the second device 120 may include a reception driver 310, a clock data recovery CDR circuit 320, a parallelization unit 330, and a demapper 340. The reception driver 310 may be electrically coupled with the signal transmission lines 251, 252 and 253, and may receive the signals transmitted from the first device 110. The reception driver 310 may include three receivers RX. The three receivers RX are respectively electrically coupled with the three signal transmission lines 251, 252 and 253 configured for transmitting three level symbols. The clock data recovery circuit 320 may receive the three level symbols received by the reception driver 310, and generate a clock signal CLK based on the three level symbols. The parallelization unit 330 may align the plurality of three level symbols received through the reception driver 310, and output the aligned symbols in synchronization with the clock signal CLK. The reception driver 310 and the parallelization unit 330 may receive seven symbols, each symbol having three level information. The demapper 340 decodes the seven symbols. The demapper 340 may decode the seven symbols in a scheme corresponding to the encoding scheme of the mapper 210. The demapper 340 may convert the seven symbols into 16 bit data DQ<0:15> according to a table stored therein. The 16 bit data DQ<0:15> outputted by the demapper 340 of the interface circuit 121 may be substantially the same data as the data inputted to the mapper 210 of the interface circuit 111.

Figure 4:
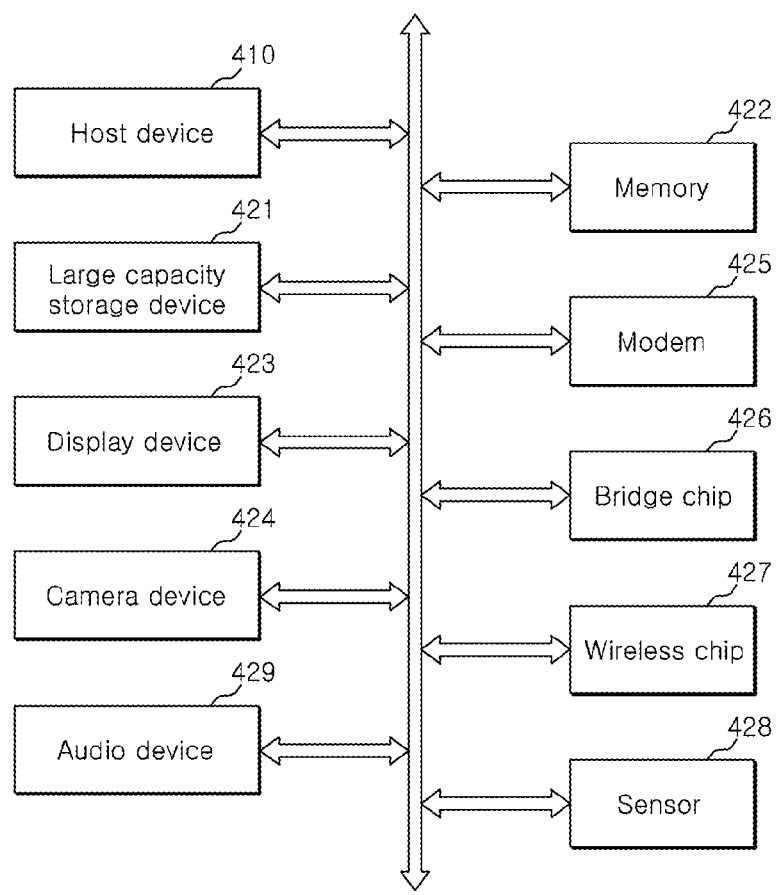
FIG. 4 is a diagram illustrating a representation of an example of a system including electronic components configured to use the balanced code multilevel signal transmission scheme described with reference to FIGS. 1 to 3.

FIG. 4 is a diagram illustrating a representation of an example of a system 4 including electronic components configured to use the balanced code multilevel signal transmission scheme described above with reference to FIGS. 1 to 3. Referring to FIG. 4, the system 4 may include a host device 410, a large capacity storage device 421, a memory 422, and a display device 423. The system 4 may include a camera device 424, a modem 425, and a bridge chip 426. The system 4 may include a wireless chip 427, a sensor 428, and an audio device 429. The host device 410 may communicate with the remaining components by forming respective individual links. The components for an electronic device illustrated in FIG. 4 are nothing but a mere illustration, and it is to be noted that the system may include any components capable of performing data communication with the host device 410.

The host device 410 may include at least one integrated circuit device such as an application processor and an application specific integrated circuit (ASIC). The large capacity storage device 421 may include at least one storage device such as a solid state drive (SSD) and a flash drive through USB coupling. The memory 422 may include any kind(s) of memory devices. For example, the memory 422 may include a volatile memory device such as a DRAM (dynamic RAM), or may include a nonvolatile memory device such as a ROM (read only memory), a PROM (programmable ROM), an EEPROM (electrically erasable and programmable ROM), an EPROM (electrically programmable ROM), a FLASH memory, a PRAM (phase change RAM), an MRAM (magnetic RAM), an RRAM (resistive RAM) and an FRAM (ferroelectric RAM).

The host device 410 may communicate with the large capacity storage device 421 and the memory 422 by forming respective links. The host device 410, the large capacity storage device 421 and the memory 422 may include the interface circuits illustrated in FIGS. 1 to 3, and may exchange signals with one another with a serial communication scheme. Similarly, the host device 410 may communicate serially with the display device 423, the camera device 424, the modem 425, the bridge chip 426, the wireless chip 427, the sensor 428 and the audio device 429 by forming individual links.

Figure 5:
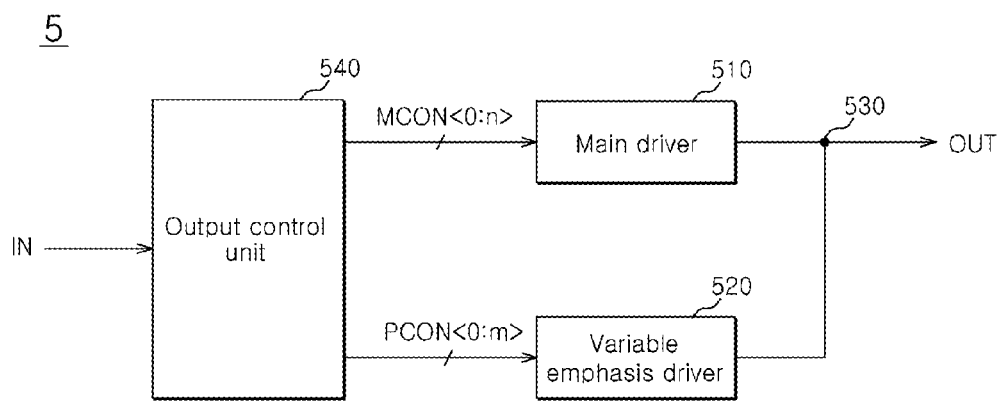
FIG. 5 is a diagram illustrating a representation of an example of the configuration of a transmission device in accordance with an embodiment.

FIG. 5 is a diagram illustrating a representation of an example of the configuration of a transmission device 5 in accordance with an embodiment. The transmission device 5 of FIG. 5 may be applied as the transmission driver 230 of the interface circuit 111 of the first device 110 illustrated in FIG. 2. Referring to FIG. 5, the transmission device 5 may include a main driver 510, and a variable emphasis driver 520. The main driver 510 may output an output signal OUT with multiple levels to an output node 530 based on an input signal IN. The multiple levels may be at least 3 levels. The multiple levels may include a plurality of levels respectively having a potential difference corresponding to a unit voltage.

In an embodiment, the multiple levels may be 3 levels, and may include a high level, a middle level and a low level. The high level may have a potential higher than the middle level, and the middle level may have a potential higher than the low level. The respective levels may have a potential difference corresponding to a unit voltage. The high level, the middle level and the low level may be levels between the power supply voltage of the main driver 510 and a ground voltage. For instance, in the example where the level of the power supply voltage is V, the high level may be a voltage level corresponding to ¾*V, the middle level may be a voltage level corresponding to 2/4*V, and the low level may be a voltage level corresponding to ¼*V. In the example where the input signal IN is a high level, the main driver 510 may generate the output signal OUT with the high level by driving the output node 530 to a voltage level corresponding to the high level. In the example where the input signal IN is a low level, the main driver 510 may generate the output signal OUT with the low level by driving the output node 530 to a voltage level corresponding to the low level. In the example where the input signal IN is a middle level, the main driver 510 may generate the output signal OUT with the middle level by driving the output node 530 to a voltage level corresponding to the middle level.

The variable emphasis driver 520 may drive the output node 530 with various driving forces based on the transition information of the input signal IN. The variable emphasis driver 520 may change a strength for driving the output node 530, according to a change in a voltage level by which transition occurs when the input signal IN transitions. The variable emphasis driver 520 may drive the output node 530 strongly as the voltage level of the input signal IN changes largely. In other words, the variable emphasis driver 520 may increase a strength for driving the output node 530, as a voltage level difference by which the input signal IN transitions is large. The variable emphasis driver 520 may drive the output node 530 with a predetermined strength, when the input signal IN transitions from any one level to an adjacent level. The variable emphasis driver 520 may drive the output node 530 until the voltage level of the output node 530 transitions from any one level to another level.

The adjacent level may mean a level that is higher or lower by a unit voltage than the any one level. The variable emphasis driver 520 may drive the output node 530 with a strength larger than the predetermined strength, when the input signal IN transitions from the any one level to a level exceeding the adjacent level. The level exceeding the adjacent level may mean a level that is higher or lower by a potential exceeding the unit voltage than the any one level.

For example, it is assumed that the multiple levels include 4 levels, the input signal IN currently inputted is the first level, and an input signal to be inputted next may transition to one of the second to fourth levels having potentials higher sequentially by a unit voltage than the first level. The second level may correspond to a potential higher by the unit voltage than the first level, the third level may correspond to a potential higher by the unit voltage than the second level, and the fourth level may correspond to a potential higher by the unit voltage than the third level. In the example where the input signal IN transitions from the first level to the second level, the variable emphasis driver 520 may drive the output node 530 with the smallest driving force. In the example where the input signal IN transitions from the first level to the fourth level, the variable emphasis driver 520 may drive the output node 530 with the largest driving force. In the example where the input signal IN transitions from the first level to the third level, the variable emphasis driver 520 may drive the output node 530 with a driving force larger than the smallest driving force and smaller than the largest driving force. Accordingly, the variable emphasis driver 520 efficiently enables the pre-emphasis of the output signal OUT according to a level change of the input signal IN.

The transmission device 5 may further include an output control unit 540. The output control unit 540 may receive the input signal IN, and may generate main driver control signals MCON<0:n> and variable emphasis driver control signals PCON<0:m> based on the input signal IN. The output control unit 540 may control the driving force of the main driver 510 and the driving force of the variable emphasis driver 520 by generating the main driver control signals MCON<0:n> and the variable emphasis driver control signals PCON<0:m>.

Figure 6:
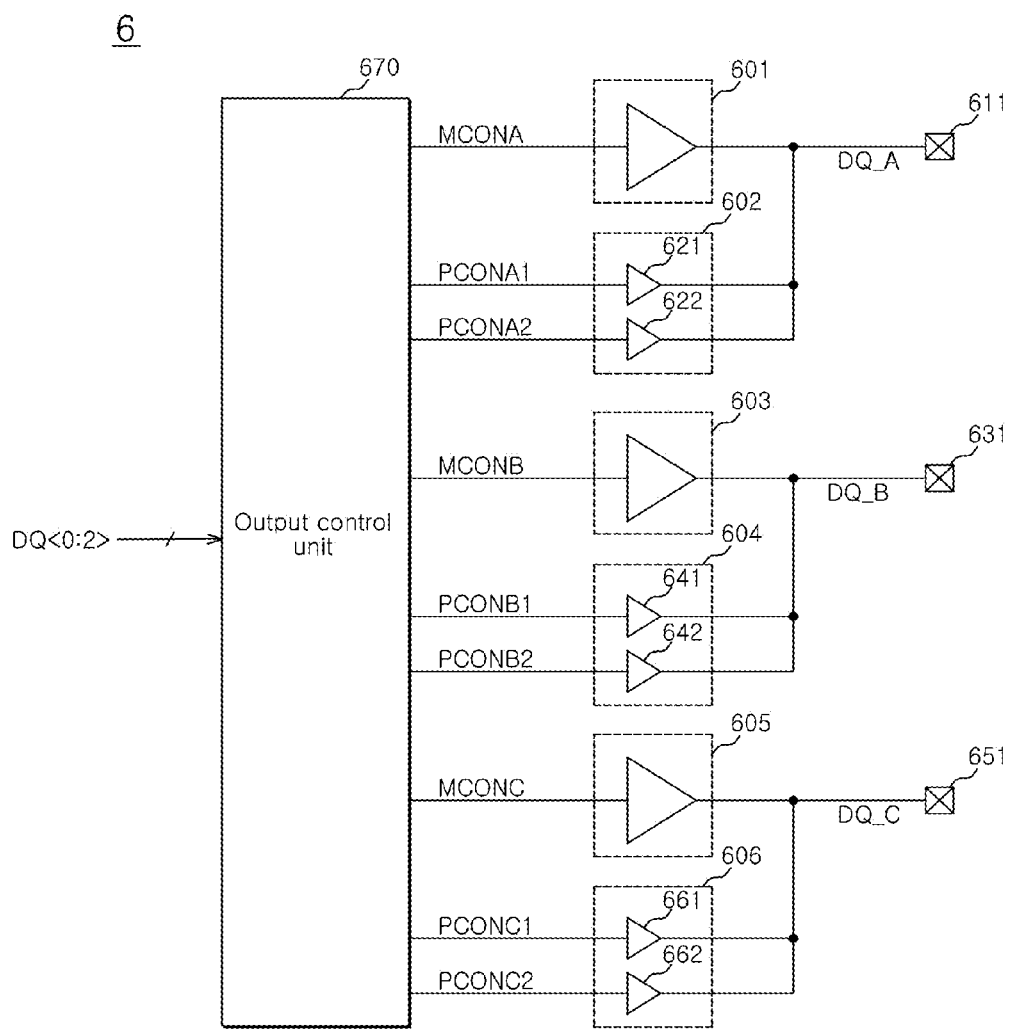
FIG. 6 is a diagram illustrating a representation of an example of the configuration of a transmission device in accordance with an embodiment.

FIG. 6 is a diagram illustrating a representation of an example of the configuration of a transmission device 6 in accordance with an embodiment. Referring to FIG. 6, the transmission device 6 may include a plurality of main drivers and a plurality of variable emphasis drivers. While FIG. 6 illustrates an example in which 3 main drivers and 3 variable emphasis drivers are provided, it is to be noted that the embodiment is not limited to such an example. The number of main drivers and variable emphasis drivers may be changed according to the number of the levels, phases or states of the data and/or symbols to be transmitted by the transmission device 6. A first main driver 601 and a first variable emphasis driver 602 may be electrically coupled with a first signal transmission line 611. The first signal transmission line 611 may be electrically coupled with a pad and an output node, and may transmit a first output signal DQ_A. The first main driver 601 and the first variable emphasis driver 602 may drive the first signal transmission line 611 and transmit the first output signal DQ_A through the first signal transmission line 611. A second main driver 603 and a second variable emphasis driver 604 may be electrically coupled with a second signal transmission line 631. The second signal transmission line 631 may be electrically coupled with a pad and an output node, and may transmit a second output signal DQ_B. The second main driver 603 and the second variable emphasis driver 604 may drive the second signal transmission line 631 and transmit the second output signal DQ_B through the second signal transmission line 631. A third main driver 605 and a third variable emphasis driver 606 may be electrically coupled with a third signal transmission line 651. The third signal transmission line 651 may be electrically coupled with a pad and an output node, and may transmit a third output signal DQ_C. The third main driver 605 and the third variable emphasis driver 606 may drive the third signal transmission line 651 and may transmit the third output signal DQ_C through the third signal transmission line 651.

The first to third main drivers 601, 603 and 605 may respectively generate the first to third output signals DQ_A, DQ_B and DQ_C with multiple levels based on input signals DQ<0:2>. For example, if the first input signal DQ<0> is a high level, the second input signal DQ<1> is a middle level and the third input signal DQ<2> is a low level, the first main driver 601 may drive the first signal transmission line 611 to the high level, the second main driver 603 may drive the second signal transmission line 631 to the middle level, and the third main driver 605 may drive the third signal transmission line 651 to the low level. The first to third main drivers 601, 603 and 605 may operate by receiving a power supply voltage. For instance, in the example where the level of the power supply voltage is V, the high level may be a voltage level corresponding to $\frac{3}{4}*V$, the middle level may be a voltage level corresponding to $\frac{2}{4}*V$, and the low level may be a voltage level corresponding to $\frac{1}{4}*V$.

The first to third variable emphasis drivers 602, 604 and 606 enable the pre-emphasis of the output signals DQ_A, DQ_B and DQ_C. To this end, the first to third variable emphasis drivers 602, 604 and 606 may respectively drive the first to third signal transmission lines 611, 631 and 651 with various driving forces based on the transition information of the first to third input signals DQ<0:2>. The first to third variable emphasis drivers 602, 604 and 606 may control the driving forces according to the level changes of the first to third input signals DQ<0:2>. The transmission device 6 may be an interface circuit capable of transmitting multilevel signals with a high level, a middle level and a low level, and the first to third input signals DQ<0:2> may each have one level of the high level, the middle level and the low level. The first variable emphasis driver 602 may additionally drive the first signal transmission line 611 when the first input signal DQ<0> transitions from any one level to another level. The first variable emphasis driver 602 may drive the first signal transmission line 611 with a first driving force when the first input signal DQ<0> transitions from the middle level to the high level, and may drive the first signal transmission line 611 with a second driving force when the first input signal DQ<0> transitions from the low level to the high level. The second driving force may be larger than the first driving force. For instance, the second driving force may be 2 times the first driving force. Similarly, the first variable emphasis driver 602 may drive the first signal transmission line 611 with the first driving force when the first input signal DQ<0> transitions from the middle level to the low level, and may drive the first signal transmission line 611 with the second driving force when the first input signal DQ<0> transitions from the high level to the low level. Namely, the first variable emphasis driver 602 may control a driving force for driving the first signal transmission line 611 based on a voltage level difference by which the first input signal DQ<0> transitions. The first variable emphasis driver 602 may drive the first signal transmission line 611 to a voltage level corresponding to the middle level when the first input signal DQ<0> retains the middle level or transitions from the high level or the low level to the middle level.

Similarly to the first variable emphasis driver 602, the second and third variable emphasis drivers 604 and 606 may control driving forces for driving the second and third signal transmission lines 631 and 651, respectively, based on voltage level differences by which the second and third input signals DQ<1> and DQ<2> transition, respectively. The second and third variable emphasis drivers 604 and 606 may drive the second and third signal transmission lines 631 and 651 to a voltage level corresponding to the middle level when the second and third input signals DQ<1> and DQ<2> retain the middle level or transition from the high level or the low level to the middle level.

Referring to FIG. 6, the first variable emphasis driver 602 may include first and second pre-emphasis drivers 621 and 622. The first and second pre-emphasis drivers 621 and 622 may drive the first signal transmission line 611 to the power supply voltage or a ground voltage based on the transition information of the first input signal DQ<0>. The first and second pre-emphasis drivers 621 and 622 may operate by receiving the power supply voltage. The first and second pre-emphasis drivers 621 and 622 may respectively have a driving force corresponding to the first driving force. The driving strength and magnitude of the first and second pre-emphasis drivers 621 and 622 may be smaller than the driving strength and magnitude of the first main driver 601. If the first input signal DQ<0> transitions from the middle level to the high level, any one of the first and second pre-emphasis drivers 621 and 622 may be turned on and drive the first signal transmission line 611 to the level of the power supply voltage. If the first input signal DQ<0> transitions from the low level to the high level, both the first and second pre-emphasis drivers 621 and 622 may be turned on and drive the first signal transmission line 611 to the level of the power supply voltage. If the first input signal DQ<0> transitions from the middle level to the low level, any one of the first and second pre-emphasis drivers 621 and 622 may be turned on and drive the first signal transmission line 611 to the level of the ground voltage. If the first input signal DQ<0> transitions from the high level to the low level, both the first and second pre-emphasis drivers 621 and 622 may be turned on and drive the first signal transmission line 611 to the level of the ground voltage. When the first input signal DQ<0> retains the middle level or transitions from the high level or the low level to the middle level, both the first and second pre-emphasis drivers 621 and 622 may be turned on. In this example, any one of the first and second pre-emphasis drivers 621 and 622 may drive the first signal transmission line 611 to the level of the power supply voltage, and the other may drive the first signal transmission line 611 to the level of the ground voltage.

The second variable emphasis driver 604 may include third and fourth pre-emphasis drivers 641 and 642, and the third variable emphasis driver 606 may include fifth and sixth pre-emphasis drivers 661 and 662. The third to sixth pre-emphasis drivers 641, 642, 661 and 662 may drive the second and third signal transmission lines 631 and 651 to the power supply voltage or the ground voltage based on the transition information of the second and third input signals DQ<1> and DQ<2>, respectively. The third to sixth pre-emphasis drivers 641, 642, 661 and 662 may operate similarly to the first and second pre-emphasis drivers 621 and 622.

The transmission device 6 may further include an output control unit 670. The output control unit 670 may control the driving forces of the first to third main drivers 601, 603 and 605 and the first to third variable emphasis drivers 602, 604 and 606 based on the first to third input signals DQ<0:2>. The output control unit 670 may generate first to third main driver control signals MCONA, MCONB and MCONC based on the first to third input signals DQ<0:2>. The first to third main drivers 601, 603 and 605 may respectively drive the first to third signal transmission lines 611, 631 and 651 to levels corresponding to the first to third input signals DQ<0:2> in response to the first to third main driver control signals MCONA, MCONB and MCONC. The output control unit 670 may generate first to sixth pre-emphasis driver control signals PCONA1, PCONA2, PCONB1, PCONB2, PCONC1 and PCONC2 based on the transition information of the first to third input signals DQ<0:2>. The first to sixth pre-emphasis driver control signals PCONA1, PCONA2, PCONB1, PCONB2, PCONC1 and PCONC2 may respectively have information on whether to turn on the first to sixth pre-emphasis drivers 621, 622, 641, 642, 661 and 662 and whether to perform pull-up or pull-down driving. The output control unit 670 may determine whether the first to sixth pre-emphasis drivers 621, 622, 641, 642, 661 and 662 pull-up or pull-down drive the first to third signal transmission lines 611, 631 and 651, based on voltage levels by which the first to third input signals DQ<0:2> transition. The output control unit 670 may generate the transition information according to the level changes of the input signals DQ<0:2>. The output control unit 670 may generate the transition information by comparing the levels of previously inputted input signals DQ<0:2> and the levels of currently inputted input signals DQ<0:2>, and generate the first to sixth pre-emphasis driver control signals PCONA1, PCONA2, PCONB1, PCONB2, PCONC1 and PCONC2 based on the transition information.

In the example where a variable emphasis driver includes at least 3 pre-emphasis drivers, transmission of multilevel signals having at least 4 levels is enabled. For example, when assuming that an output signal may have a low level, a middle-low level, a middle-high level and a high level, a variable emphasis driver may include 3 pre-emphasis drivers. If an input signal transitions from a middle-high level to a high level, 1 pre-emphasis driver may be turned on and drive a signal transmission line to a power supply voltage, and if the input signal transitions from a middle-low level to the high level, 2 pre-emphasis drivers may be turned on and drive the signal transmission line to the power supply voltage. Further, if the input signal transitions from a low level to the high level, all the 3 pre-emphasis drivers may be turned on and drive the signal transmission line to the power supply voltage. Accordingly, a pre-emphasis strength may be variously changed according to a level by which the input signal transitions, and the transition time of the output signal outputted through the signal transmission line may be variously controlled.

Figure 7:
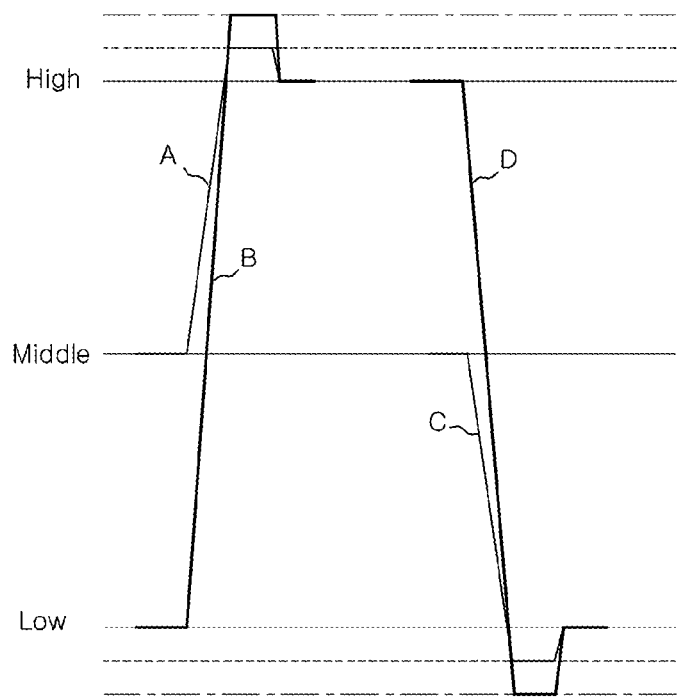
FIG. 7 is a representation of an example of a timing diagram to assist in the explanation of the operation of the transmission device illustrated in FIG. 6.

FIG. 7 is a representation of an example of a timing diagram to assist in the explanation of the operation of the transmission device 6 illustrated in FIG. 6. Referring to FIG. 7, illustrated are a waveform A of the first output signal DQ_A in the example where the first input signal DQ<0> transitions from the middle level to the high level and a waveform B of the first output signal DQ_A in the example where the first input signal DQ<0> transitions from the low level to the high level. In the example of the waveform A, any one of the first and second pre-emphasis drivers 621 and 622 may be turned on, and the turned-on one pre-emphasis driver may drive the first signal transmission line 611 to the level of the power supply voltage. As the first signal transmission line 611 is driven to the high level by the first main driver 601 and is additionally driven by the turned-on one pre-emphasis driver, the first signal transmission line 611 may easily reach the high level. In the example of the waveform B, since the level change of the first input signal DQ<0> is larger than the case of the waveform A, both the first and second pre-emphasis drivers 621 and 622 may be turned on and drive the first signal transmission line 611 to the level of the power supply voltage. The variable emphasis driver 602 may drive the first signal transmission line 611 with a first driving force in the example used with the waveform A, and may drive the first signal transmission line 611 with a second driving force larger than the first driving force in the example used with the waveform B. Accordingly, even when the first input signal DQ<0> transitions by a large voltage level difference, the first signal transmission line 611 may easily reach the high level. In an embodiment, by controlling the driving force of the variable emphasis driver 602, it may be possible to make a time at which the first signal transmission line 611 transitions to the high level in the example of the waveform A and a time at which the first signal transmission line 611 transitions to the high level in the case of the waveform B, the same or substantially the same.

Referring to FIG. 7, there are illustrated a waveform C of the first output signal DQ_A in the example where the first input signal DQ<0> transitions from the middle level to the low level and a waveform D of the first output signal DQ_A in the example where the first input signal DQ<0> transitions from the high level to the low level. In the example of the waveform C, any one of the first and second pre-emphasis drivers 621 and 622 may be turned on, and the turned-on one pre-emphasis driver may drive the first signal transmission line 611 to the level of the ground voltage. As the first signal transmission line 611 is driven to the low level by the first main driver 601 and is additionally driven by the turned-on one pre-emphasis driver, the first signal transmission line 611 may easily reach the low level. In the example of the waveform D, since the level change of the first input signal DQ<0> is larger than the example of the waveform C, both the first and second pre-emphasis drivers 621 and 622 may be turned on and may drive the first signal transmission line 611 to the level of the ground voltage. The variable emphasis driver 602 may drive the first signal transmission line 611 with the first driving force in the example used with the waveform C, and may drive the first signal transmission line 611 with the second driving force larger than the first driving force in the example used with the waveform D. Accordingly, even when the first input signal DQ<0> transitions by a large voltage level difference, the first signal transmission line 611 may easily reach the low level.

In the embodiments, since the pre-emphasis strength of an output signal to be transmitted through a signal transmission line is controlled in a variety of ways according to the transition information of an input signal, a signal may be precisely transmitted, and the data eye or window of the signal to be transmitted through the signal transmission line may be sufficiently secured.

While various embodiments have been described above, it will be understood to those skilled in the art that the embodiments described are examples only. Accordingly, the interface circuit for high speed communication and the system including the same described herein should not be limited based on the described embodiments.

What is claimed is:

1. A transmission device comprising:
    a main driver configured to output an output signal with one level among a high level, a middle level and a low level, to an output node, based on an input signal; and
    a variable emphasis driver configured to drive the output node with one of first and second driving forces based on transition information of the input signal, wherein the variable emphasis driver drives the output node to a voltage level corresponding to the middle level when the input signal retains the middle level or when the input signal transitions from the low level or high level to the middle level,
    wherein the variable emphasis driver drives the output node to both a power supply voltage and a ground voltage simultaneously to drive the output node to the middle level.

2. The transmission device according to claim 1, wherein the high level has a potential higher by a unit level than the middle level, and the middle level has a potential higher by the unit level than the low level.

3. The transmission device according to claim 2,
    wherein the second driving force is larger than the first driving force, and
    wherein the variable emphasis driver drives the output node with the first driving force when the input signal transitions from any one level by one unit level, and drives the output node with the second driving force when the input signal transitions by two unit levels.

4. The transmission device according to claim 1, wherein the variable emphasis driver comprises:
    a first pre-emphasis driver configured to drive the output node to one of a power supply voltage and a ground voltage according to the transition information of the input signal; and
    a second pre-emphasis driver configured to drive the output node to one of the power supply voltage and the ground voltage according to the transition information of the input signal.

5. The transmission device according to claim 4, wherein one of the first and second pre-emphasis drivers drives the output node to a level of the power supply voltage when the input signal transitions from the middle level to the high level, and both the first and second pre-emphasis drivers drive the output node to the level of the power supply voltage when the input signal transitions from the low level to the high level.

6. The transmission device according to claim 4, wherein one of the first and second pre-emphasis drivers drives the output node to a level of the ground voltage when the input signal transitions from the middle level to the low level, and both the first and second pre-emphasis drivers drive the output node to the level of the ground voltage when the input signal transitions from the high level to the low level.

7. The transmission device according to claim 4, wherein, when the input signal transitions to the middle level, one of the first and second pre-emphasis drivers drives the output node to the level of the power supply voltage, and the other drives the output node to the level of the ground voltage.

8. The transmission device according to claim 1, wherein the variable emphasis driver drives the output node until a voltage level of the output node transitions from any one level to another level.

9. The transmission device according to claim 1, further comprising:
    an output control unit configured to control a driving force of the main driver and a driving force of the variable emphasis driver based on the input signal.

10. The transmission device according to claim 9, wherein the output control unit generates the transition information by comparing a previously inputted input signal and a currently inputted input signal.

11. The transmission device according to claim 1, wherein the high level has ¾ of a voltage level, the middle level has ²⁄₄ of the voltage level, and the low level has ¼ of the voltage level.

* * * * *